US012688461B2

(12) United States Patent
Subramaniam et al.

(10) Patent No.: US 12,688,461 B2
(45) Date of Patent: Jul. 21, 2026

(54) RECONFIGURABLE COMPUTING FABRIC FOR MACHINE LEARNING PROCESSING

(71) Applicant: Hewlett-Packard Development Company, L.P., Spring, TX (US)

(72) Inventors: Ravi Shankar Subramaniam, Palo Alto, CA (US); Robert Campbell, Palo Alto, CA (US); Jeffrey Kevin Jeansonne, Spring, TX (US); Lan Wang, Spring, TX (US); Christopher Charles Mohrman, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 560 days.

(21) Appl. No.: 18/250,517

(22) PCT Filed: Oct. 29, 2020

(86) PCT No.: PCT/US2020/057950
§ 371 (c)(1),
(2) Date: Apr. 25, 2023

(87) PCT Pub. No.: WO2022/093231
PCT Pub. Date: May 5, 2022

(65) Prior Publication Data
US 2023/0394364 A1 Dec. 7, 2023

(51) Int. Cl.
*G06N 20/00* (2019.01)
(52) U.S. Cl.
CPC .................................... *G06N 20/00* (2019.01)
(58) Field of Classification Search
CPC .................................................. G06N 20/00
See application file for complete search history.

(56) References Cited

U.S. PATENT DOCUMENTS 9,705,904 B1 7/2017 Davis et al.
9,710,748 B2 7/2017 Ross et al.
(Continued)

FOREIGN PATENT DOCUMENTS

CN 110023905 A 7/2019

OTHER PUBLICATIONS

Chung et al., "Serving DNNs in Real Time at Datacenter Scale with Project Brainwave", IEEE Micro, vol. 38, No. 2, Mar. 1, 2018, pp. 8-20.
(Continued)

*Primary Examiner* — Kenneth B Lee, Jr.
(74) *Attorney, Agent, or Firm* — Quarles & Brady LLP

(57) ABSTRACT

One example provides a reconfigurable computing fabric to manage machine learning (ML) processing including a configurable interconnect structure and a number programmable logic blocks each having a configurable set of operations. For each of a number of fabric configurations of the computing fabric, each programmable logic block has a corresponding set of operations and the interconnect structure has a corresponding data path structure to interconnect the programmable logic blocks with one another and with inputs and outputs of the computing fabric. The programmable logic blocks include an input/output block having a set of operations including to provide virtual interfaces to receive external session requests for ML processing from request sources, and an elastic AI/ML processing block having a set of operations including to configure a number of AI/ML engines with a session implementation for each external session request and each of a number of event-driven internal session requests.

20 Claims, 5 Drawing Sheets

(56) References Cited

U.S. PATENT DOCUMENTS

| | | |
|---|---|---|
| 9,875,445 B2 | 1/2018 | Amer et al. |
| 10,089,576 B2 | 10/2018 | Gao et al. |
| 10,379,842 B2 | 8/2019 | Malladi et al. |
| 12,147,836 B2 * | 11/2024 | Mohapatra .............. G06F 7/485 |
| 2009/0118841 A1 * | 5/2009 | Grichnik ............ G05B 23/0221 |
| | | 700/67 |
| 2017/0103313 A1 | 4/2017 | Ross et al. |
| 2018/0139110 A1 | 5/2018 | Johnson et al. |
| 2019/0042878 A1 | 2/2019 | Sheller et al. |
| 2019/0279044 A1 | 9/2019 | Vasisht et al. |
| 2019/0377403 A1 | 12/2019 | Sika |
| 2020/0167593 A1 * | 5/2020 | Kim ..................... G06F 16/285 |

OTHER PUBLICATIONS

Romero et al., "INFaaS: A Model-less Inference Serving System", arXiv, Sep. 25, 2019, pp. 1-15.

* cited by examiner

RECONFIGURABLE COMPUTING FABRIC FOR MACHINE LEARNING PROCESSING

BACKGROUND

Machine learning (ML) processing at the extreme edge (i.e., on a PC) provides users with responsive and context sensitive experiences.

DETAILED DESCRIPTION

Figure 1:
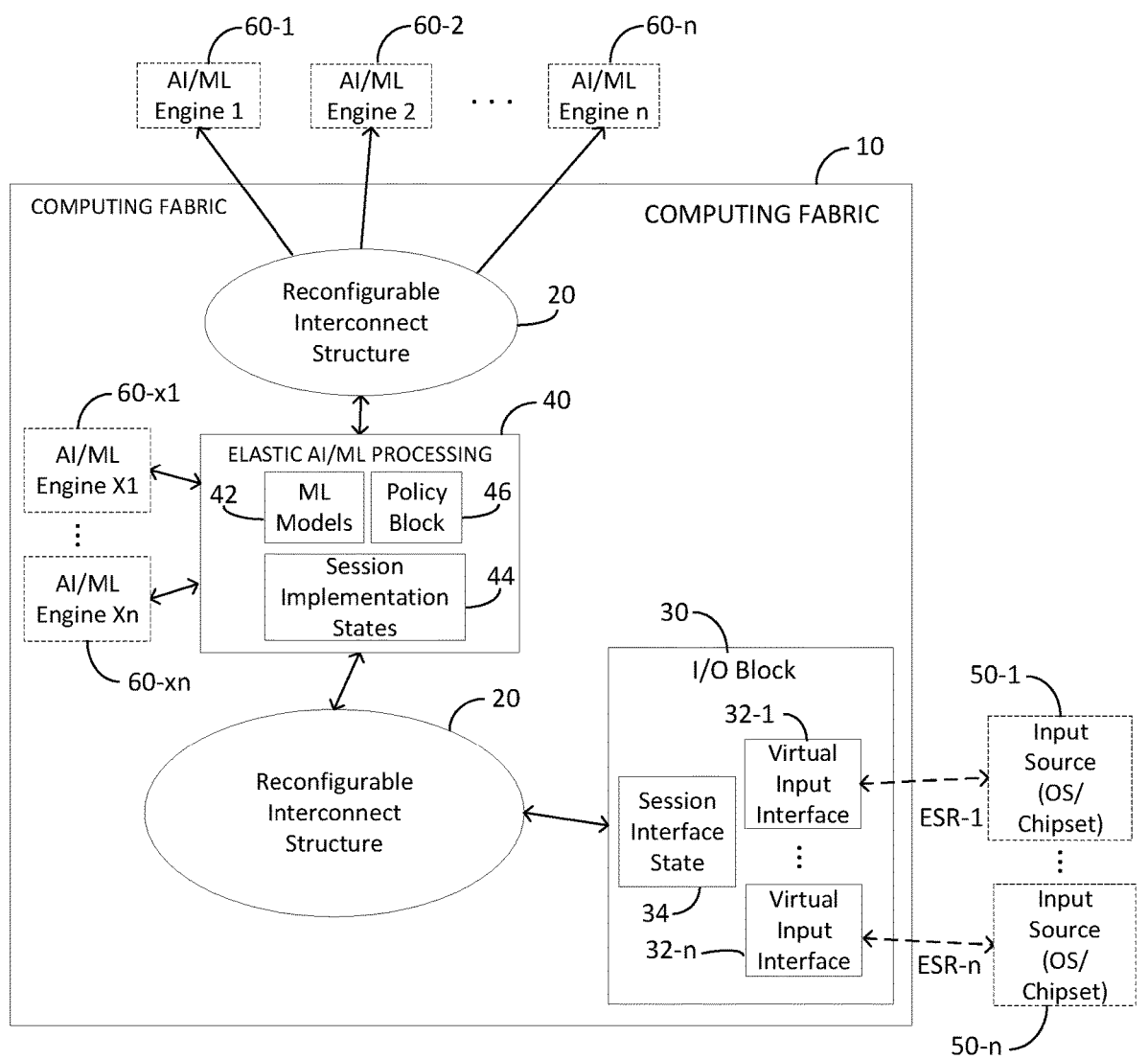
FIG. 1 is a block and schematic diagram generally illustrating a reconfigurable computing fabric to manage machine learning processing, according to one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Machine learning (ML) processing at the extreme edge (e.g., on a PC) provides highly responsive and context sensitive user experiences. In some cases, ML is currently performed on the operating system and central processing unit (OS/CPU) of a PC (e.g., a system on a chip (SoC)). However, such approach is inefficient and may diminish the battery life of a PC. Also, a single ML model built across multiple input features makes the corresponding neural network large and expensive to compute. In other cases, ML is performed on AI accelerator chips, but such accelerator chips (as well as sensors providing input data) are "hardwired" with the OS/CPU. Because OS/CPUs and companion chipsets from different vendors have different requirements and support, such a "hardwired" approach makes it difficult to achieve a consistent experience across different PC computing platforms.

According to the present disclosure, a dynamically reconfigurable ML platform is provided which is a companion subsystem to a chipset and operates below an operating running thereon. In examples, using configurable virtual interfaces, the ML platform is dynamically adaptable to operate and provide a consistent computing experience with OS/chipsets of any number of various vendors, as well as with requests over network connections (e.g., the Internet). The reconfigurable ML platform employs device agnostic software to enable operation across various types of devices including desktop computers, laptops, tablet PCs, and smartphones, for example. In examples, the ML platform dynamically configures and integrates a number of Deep Neural Network (DNN) models on a number of artificial intelligence (AI/ML) engines to process feature data (input data) from a number of input sources (including physical sensors) in response to session requests from request sources, such as from an OS/chipset of a PC in which the ML platform is implemented or from a network source.

In examples, the ML platform may include a number of physical sensors, a number of AI/ML engines, and a dynamically reconfigurable computing fabric to manage ML processing, including AI/ML engine configuration and input data management. In examples, the dynamically reconfigurable computing fabric (e.g., a field programmable gate array) includes a reconfigurable interconnect structure and a number of programmable logic blocks, each of which have a configurable set of operations. The programmable computing fabric is dynamically configurable to a number of fabric configurations (e.g., via an external supervisory controller), where for each fabric configuration, each programmable logic block has a corresponding set of operations and the interconnect structure has a corresponding data path structure to interconnect the programmable logic blocks with one another and with inputs and outputs of the computing fabric.

In examples, the programmable logic blocks include an input/output block and an elastic AI/ML processing block. In examples, the input/output block has a set of operations including to provide customizable virtual input interfaces to receive external session requests for ML processing from a number of request sources (e.g., PC, network), and to provide customizable virtual source interfaces with a number data sources (e.g., sensors) to receive input data (session data) for satisfying a session request. In examples, such session data may be representative of a measured feature or parameter sensed provided by a sensor.

In examples, the elastic AI/ML processing block has a set of operations including to configure the AI/ML engines with session implementation for each session request, both internal session requests and internal event-driven session requests, and to direct the session data for each session request to the AI/ML engines configured with the corresponding session implementation for processing. In examples, configuring the AI/ML engines includes loading different ML models onto AI/ML engines, partitioning ML models onto multiple AI/ML engines and running the AI/ML engines in parallel to create a larger ML model, processing a first portion of session data representing a first input feature on one AI/ML engine and a second portion of session data on another AI/ML engine, instantiating an AI/ML on the fabric, and any number of other suitable operations.

Dynamically integrating and configuring multiple, smaller DNN models on a number of AI/ML engines across multiple input features via the dynamically programmable computing fabric provides flexibility and responsiveness not available in statically wired platforms. Additionally, the customizable virtual interfaces enable the ML platform to be employed with different OS/chipsets and further allows the ML platform to operate even when the OS/chipset is in sleep/hibernate/off modes, thereby enabling ML models to continue processing when the OS/chipset is in such a state.

In other examples, programmable logic blocks include an elastic sensor management block to provide dynamic sensor functionality and sensor fungibility. Dynamic sensor functionality enables the programmable computing fabric to dynamically create "virtual" sensors from one or more physical sensors, where the feature data from one or more physical sensors, either separately or in combination, is transformed to be representative of a feature other than the feature the one or more physical sensors are designed to measure. In examples, the sensor options available may be different for each fabric configuration.

Sensor fungibility enables the programmable computing fabric to select which sensor (physical or virtual) to employ for obtaining feature data when multiple sensors provide such feature data. In examples, determining which sensor to employ may be based on operating policies and on parameters of the corresponding session request. In examples, elastic sensor management may include dynamically creating a virtual sensor in response to a particular session request.

In examples, the ML platform includes a supervisory controller apart from the programmable computing fabric, where the supervisory controller communicates with the computing fabric to configure the computing fabric to any number of fabric configurations. In examples, available fabric configurations are stored in a secure storage, such as on the programmable computing fabric, for instance.

FIG. 1 is a block and schematic diagram generally illustrating a dynamically reconfigurable computing fabric 10 for machine learning (ML) processing, including deep neural network processing, according to one example of the present disclosure. In examples, as will be described in greater detail below, computing fabric 10 is arranged as part of a ML platform implemented as a companion subsystem adaptable for use with any number of OS/CPU chipsets and computing devices (e.g., PCs, laptops, desktops, all-in-one (AIO) computers, smartphones, etc.). In examples, computing fabric 10 may be implemented in an edge computing device.

In one example, reconfigurable computing fabric 10 includes a reconfigurable interconnect structure 20 and a number of programmable logic blocks, such as an input/output (I/O) block 30 and an elastic artificial intelligence (AI)/ML processing block 40, for instance, where each programmable logic block performs operations from a configurable set of operations. In examples, computing fabric 10 is dynamically reconfigurable to a number of fabric configurations, where for each fabric configuration, each programmable logic block has a corresponding set of operations, and interconnect structure 20 has a corresponding data path structure to interconnect the programmable logic blocks with one another and with inputs and outputs of computing fabric 10. In examples, the configurable set of operations of each programmable logic block is based on a hardware and software setup of the programmable logic block, where the hardware and software setup may be different for each fabric configuration. As such, the hardware and software configurations and capabilities of each programmable logic block, along with the configurable set of operations, may be different for each fabric configuration. In one example, reconfigurable computing fabric 10 comprises a field programmable gate array (FPGA).

In one example, I/O block 30 has a set of operations including to provide customizable virtual input interfaces 32, such as virtual input interfaces 32-1 and 32-n, to receive external session requests for ML processing from a number of request sources 50, such as external session requests ESR-1 and ESR-n from request sources 50-1 and 50-n. In some cases, external sources 50 include an OS/chipset of a computing device in which computing fabric is deployed, and a network source (e.g., a device in communication with computing fabric 10 via a network). In examples, a virtual input interface 32 is provided for each session established with a request source 50, wherein a session state is maintained for each virtual input interface 32 for a duration of the session to enable concurrent processing of multiple sessions by computing fabric 10, such as indicated by session interface states block 34. It is noted that once established, each session may include multiple requests ("session requests"), where maintaining the session state enables computing fabric 10 to maintain context between session requests of a given session.

In one example, elastic AI/ML processing block 40 has a set of operations including to configure for ML processing a number of AI/ML engines 60 (such as illustrated by AI/ML engines 60-1, 60-2, ..., 60-n) with a session implementation for each external session request and for each of a number of event-driven internal session requests. Elastic AI/ML processing block 40 then directs data for each session request to the AI/ML processing engines 60 configured according to the corresponding session implementation for processing. As will be described in greater detail below, data for each session request may originate with any number of data sources, such as sensors, network endpoints, and stored information ("data at rest"), for example.

In examples, configuring a number of AI/ML engines 60 according to a session implementation for a session request may include any number of operations, such as loading particular ML models, such as from ML model library 42 (where each ML model is configured for different types of data), onto one or more of the AI/ML engines 60, partitioning a ML model onto multiple AI/ML engines 60 and configuring AI/ML engines 60 in parallel to create a larger ML model, configuring the AI/ML engines 60 to process data representative of one input feature on one AI/ML engine 60 and data representative of another input feature on another AI/ML engine 60, and instantiating a number of AI/ML engine, such as illustrated by AI/ML engines 60-x1 to 60-xn, on computing fabric 10, for example. Any number of suitable implementations may be employed.

For example, in one case, for a first session request, such as external session request ESR-1, elastic AI/ML processing block 40 may partition an AI/ML model between AI/ML engines 60-1 and 60-2 and parallel process the partitioned model to create a larger ML model running on two smaller AI/ML engines 60-1 and 60-2. In a second case, for a second session request, such as external session request ESR-n, elastic AI/ML processing block 40 may load an ML model onto AI/ML engine 60-2 and process input data using on a single AI/ML engine. In examples, external session requests ESR-1 and ESR-n may be concurrently processed by computing fabric 10, wherein elastic AI/ML processing block 40 maintains a session implementation state for a duration of each session, such as indicated by session implementation state block/index 44, where each session has a unique session identifier, so that elastic AI/ML processing block can reestablish a proper state/session implementation for each concurrent session.

In examples, elastic AI/ML processing block 40 may have multiple session implementation options for processing data for a session request (internal and external). For example, in one case, for a given session request, elastic AI/ML processing block may have a first session implementation option for processing data corresponding to the session request using a smaller and less complex first ML model 42 on a single AI/ML engine 60, and a second session implementation option for processing the data corresponding to the session request using a larger and more complex second model 42 which is partitions between two AI/ML engines 60. In such a case, elastic AI/ML processing block 40 may decide between the first and second options based on a number operational policies, such as indicated by policy block 46. Operational policies may include any number of factors and objectives such as required processing time, power consumption requirement (e.g., if computing fabric 10 is operating on battery power), and accuracy of ML processing results.

In one case, based on operating parameters (including requirements of the session request query), elastic AI/ML processing block may choose to employ the first session implementation option because, although a corresponding output result may be less accurate than that provided by the second option, the first option has a shorter processing time and consumes less power. In another case, based on the operating parameters), elastic AI/ML processing block may choose to employ the second session implementation option because the session request query specifically requested a higher accuracy result.

It is noted that the number and type of ML models 42, the interconnect structure with AI/ML engines 60, and the operational policies of policy block 46 may be different for each fabric configuration of computing fabric 10. It is further noted that, as described above, for each fabric configuration of computing fabric 10, the interconnect structure between the programmable logic blocks, as well as hardware and software setups of each programmable logic block and, thus the capabilities (i.e., the configurable set of operations), may be different. As such, both hardware and software of computing fabric 10 may be variable between each fabric configuration.

By employing customizable virtual input interfaces, computing fabric 10 is dynamically adaptable to operate and provide consistent computing experiences with devices employing OS/chipsets of any number of various vendors, as well as network devices. Also, by dynamically reconfiguring and interconnecting a number of deep neural network (DNN) models on a number of AI/ML engines, computing fabric 10 provides low latency integration of multiple DNNs while providing responsiveness and throughput to provide a compelling user experience. The ability to reconfigure computing fabric 10 to a number of fabric configurations also enables ML models and capabilities to be changed on up to a session-by-session basis, as opposed to providing static ML processing capabilities.

Figure 2:
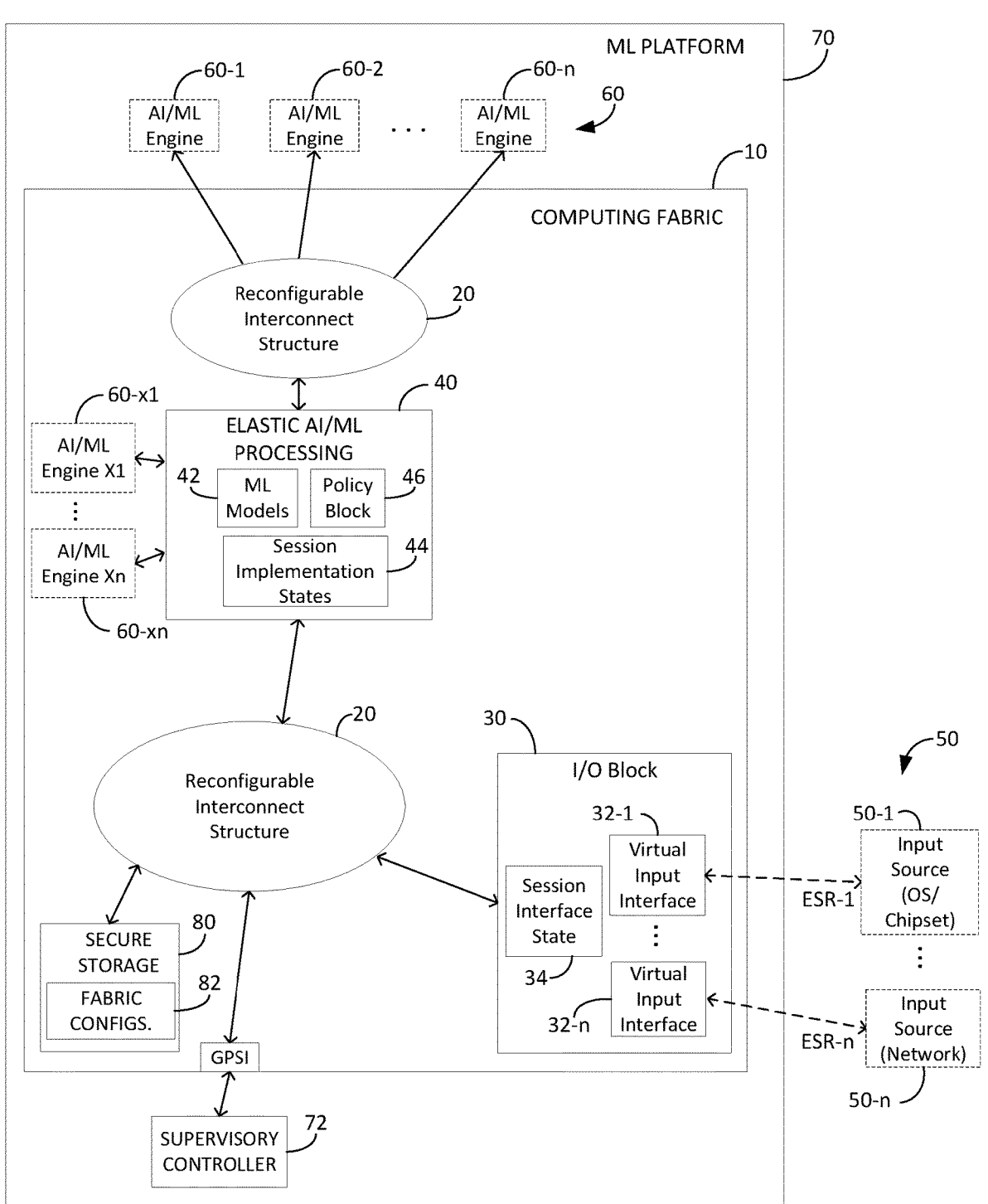
FIG. 2 is a block and schematic diagram generally illustrating a machine learning platform, according to one example.

FIG. 2 is a block and schematic diagram generally illustrating an ML platform 70 including computing fabric 10, according to one example. As illustrated, in addition to computing fabric 10, ML platform 70 includes a supervisory controller 72 in communication with computing fabric 10, such as via a general purpose serial interface (GPSI). In examples, supervisory controller 72 controls the fabric configuration to which computing fabric 10 is set. In one example, supervisory controller 72 sets the fabric configuration to a selected one of a number of available fabric configurations stored in a secure storage. In one example, such a secure storage 80 storing a number of fabric configurations 82 is implemented as part of computing fabric 10. In other examples, fabric configurations 82 may be stored in secure storage residing elsewhere. In one example, supervisory controller 72 is a microcontroller.

Figure 3:
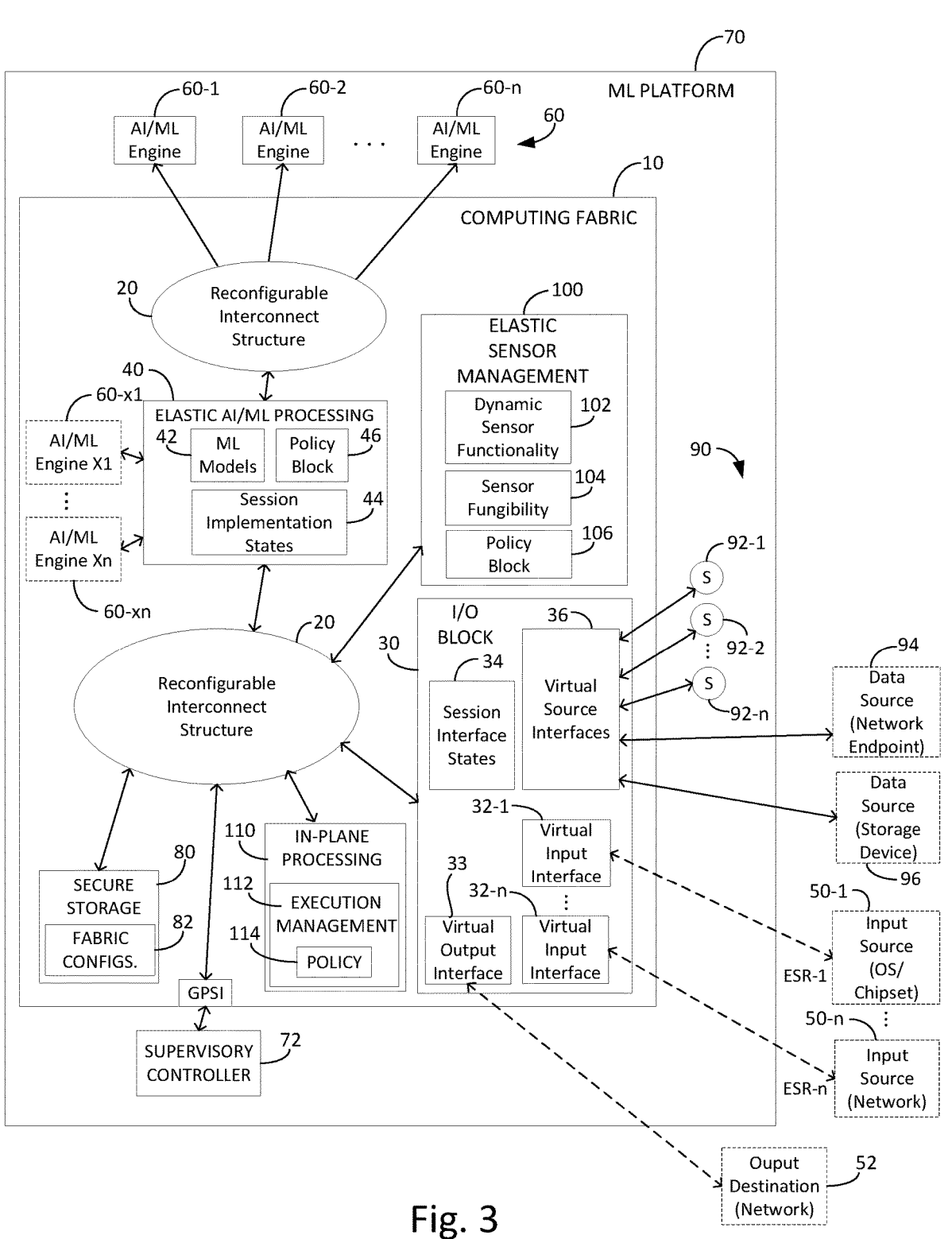
FIG. 3 is a block and schematic diagram generally illustrating a machine learning platform, according to one example.

FIG. 3 is a block and schematic diagram generally illustrating ML platform 70, according to one example of the present disclosure. In one example, in addition to reconfigurable computing fabric 10 and supervisory controller 72, ML platform 70 includes AI/ML engines 60, and further includes a number of data sources 90. In examples, data sources 90 include any number of sources which provide input data (e.g. feature data) for ML processing of session requests by computing fabric 10. In examples, data sources 90 include a number of physical sensors 92, illustrated as sensors 92-1, 92-2, . . . , 92-n, where such physical sensors may be designed to provide output data representative of any number of parameters. For example, such sensors 92 may include any number sensor types, such as temperature sensors, motion sensors (e.g., Time of Flight (ToF) sensors), acoustic sensors, and moisture sensors, for instance. Sensors 92 may also include any other number of other devices such as visible spectrum cameras, infrared cameras, and thermal imagers, for example. In other examples, data sources 90 may also include data sources such as network endpoints (e.g., online sensor data such as environmental temperatures, wind speed, etc.), as illustrated at 94, and data sources comprising stored data, such as data stored in a local storage device (such as memory in a PC in which ML platform 70 is implemented) or a remote storage device (e.g., cloud based storage), as illustrated at 96. Such stored data is sometimes referred to as "data at rest".

ML platform 70 further includes an elastic sensor management block 100. In one example, elastic sensor management block 100 includes a dynamic sensor functionality block 102, and a sensor fungibility block 104. Dynamic sensor functionality block 102 includes a set operations to create "virtual" sensor data from one or more physical sensors by employing processing logic to transform the data obtained from a physical sensor which is representative of a first feature or parameter to data representative of second feature or parameter (where such second feature or parameter is something other the first feature or parameter for which the physical sensor is explicitly designed to measure). For example, if a physical sensor is a visible spectrum camera providing data representative of an image, dynamic sensor functionality block 102 may employ a processing logic block to transform the output data of the camera from being representative of an image to being representative of a motion sensor output.

Sensor fungibility block 104 includes a set of operations to select which sensor is to provide session request data for a given feature for processing of a session request when multiple sensors (both virtual and physical) provide data representative the given feature. Continuing with the above example, in a case where dynamic sensor functionality block 102 provides a "virtual" motion sensor by transforming data from a visible spectrum camera, and where a physical motion sensor 92 (e.g., a TofF sensor) is also available, sensor fungibility block 104 selects which motion sensor is to provide motion sensing data in response to the session request. In examples, sensor fungibility block makes such decisions based on operating policies, as indicated by policy block 106. Such policies may include a required accuracy of the motion sensing signal (e.g., the motion sensing signal provided by the virtual motion sensor (e.g., the transformed camera output) may be more accurate than the ToF sensor signal), a time duration to satisfy the request (e.g., the ToF sensor may provide a quicker response time), and whether the session request specified a particular type of sensor output, for example. As described above with respect to elastic AI/ML processing block 40, it is noted that such policy decisions, in some examples, may be made locally to the programmable logic blocks (e.g., distributed control), whereas in other examples such policy decisions may be centrally performed (e.g., see execution management block 112), or some combination thereof.

In examples, similar to that described above with respect to virtual input interfaces, for each fabric configuration, I/O block 30 includes a set of operations to provide virtual source interfaces 36 to communicate with data sources 90, including with sensors 92, both physical sensors and virtual sensors, in order to provide data to satisfy session request queries. In examples, I/O block 30, in response to session request queries, includes operations to provide a number of virtual output interfaces, such as indicated by virtual output interface 33, to provide output data to output destinations (e.g., network endpoints, monitors, etc.), such as indicated by output destination 52. Similar to that described above with respect to virtual input interfaces, session interface states for such virtual source interfaces 36 and virtual output interfaces 33 are maintained for a life of each session by session interface states block 34.

Figure 4:
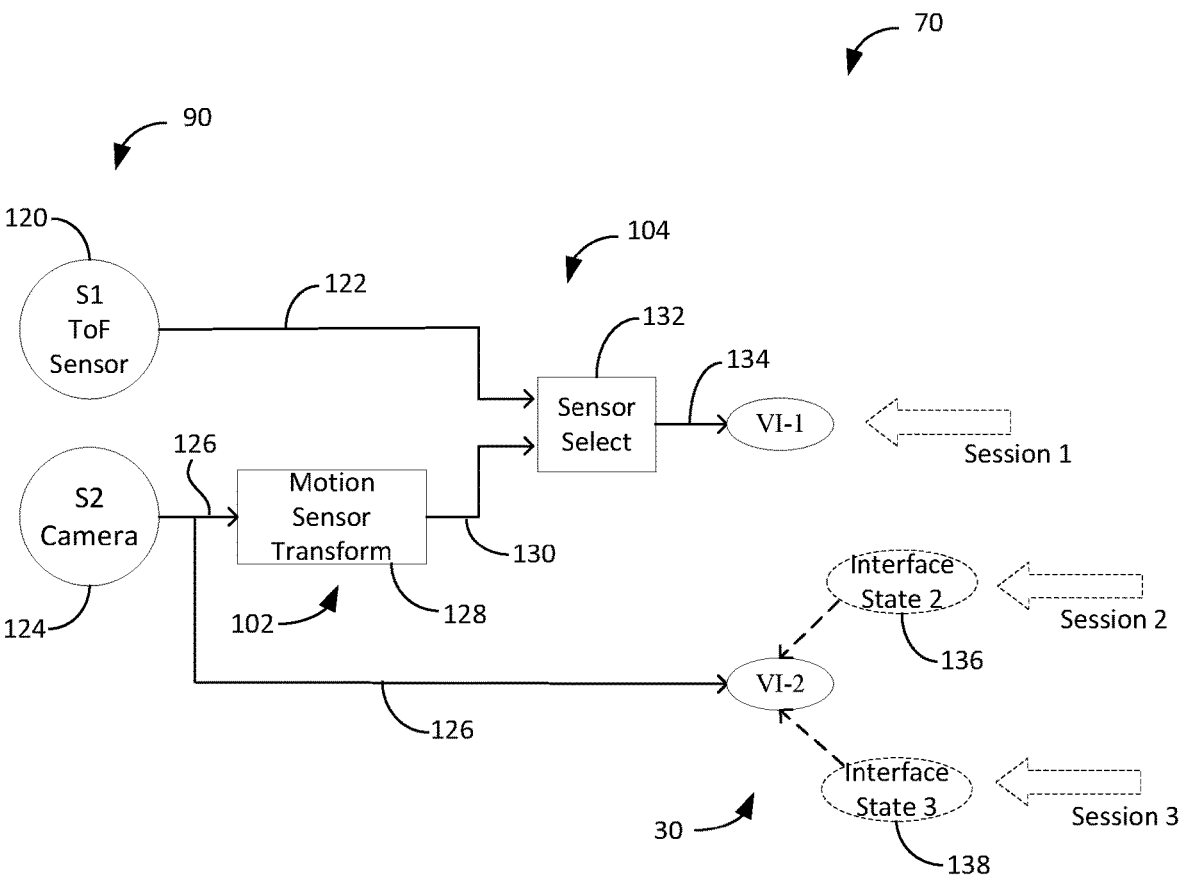
FIG. 4 is a block and schematic diagram generally illustrating elastic sensor management, according to one example.

FIG. 4 is a block and schematic diagram demonstrating dynamic sensor functionality and sensor fungibility, according to one example. It is noted that the concept of virtual interfaces is also illustrated in this example. According to the illustrated example, ML platform 70 includes a ToF motion sensor device 120 (sensor S1) providing a motion sensing signal 122 and a visual spectrum video camera 124 (sensor S2) providing an audio/video signal 126. According to a given fabric configuration, dynamic sensor functionality block 102 includes an operation to provide a motion sensor transform processing logic block 128 to transform audio/visual signal 126 to a virtual motion sensing signal 130. Additionally, sensor fungibility block 104 includes a sensor select logic block 132 to select which of the motion sensing signal 122 and virtual motion sensing signal 130 to provide as input motion sensing signal 134 in response to a session request.

In the illustrated example, a first session (Session 1) is illustrated as having requested a motion sensing input and is illustrated as being in communication via a virtual interface, VI-1, with the motion sensor 140 formed by the combination of first sensor (S1) 120 and the transformed output of second sensor (S2) 124. In one example, based on operating policies of ML platform 70, sensor select block 132 selects motion sensing signal 122 or virtual motion sensing signal 130 as motion sensing signal 134 in response to a session request of session 1.

In FIG. 4, it is further illustrated that two concurrent sessions, indicated as session 2 and session 3, are requesting audio/video signal 126, where sessions 2 and 3 are in communication with second sensor 124 via virtual interface, VI-2. When session 2 is active, virtual interface VI-2 is configured with an interface state 136 corresponding to session 3, and configured with an interface state 138 corresponding to session 3, where such interface states are maintained by session interface state block 34 (see FIG. 3).

Returning to FIG. 3, in examples, ML platform additionally includes in-plane processing functionality, such as in-plane processing block 110. As illustrated, in some examples, an execution management block 112 is implemented on in-plane processing block 110 and includes a policy block 114. In some examples, execution management block 112 determines work flows to manage the processing of session requests (both external and internal session requests) by computing fabric 10. In some examples, rather than elastic AI/ML processing block 40 making decisions regarding configuring of AI/ML engines 60, and elastic sensor management block 100 making decisions regarding sensor fungibility, such decisions are made centrally by execution management block 112. In other examples, execution management and policy decision processes may be distributed across various programmable logic blocks of computing fabric 10, such as described above with respect to elastic AI/ML processing block 40 and elastic sensor management block 100, or may be a combination of central and distributed control.

In one example, upon receiving a session request, execution management block 112 interprets the request and determines whether the request can be satisfied based on the processing capabilities of the fabric configuration currently installed on computing fabric 10. For example, for each fabric configuration, elastic AI/ML processing block 40 includes different ML models and different AI/ML engine configurations, and elastic sensor management block creates different "virtual" sensor capabilities and has access to different network endpoints and stored information (i.e., "data at rest"). As such, for each fabric configuration, ML platform 70 has different ML processing capabilities. In one example, if execution management block 112 determines that the fabric configuration currently installed on computing fabric 10 is incapable of satisfying a session request, execution management block 112 determines whether another fabric configuration is capable of satisfying the request. In example, if another fabric configuration is capable of satisfying the session request, execution management block 112 may request that such other fabrication be installed on computing fabric 10 by supervisory controller 72. If no fabric configurations are capable of satisfying the session request, execution management block 112 may provide a message to the input source which initiated the session request that such request is unable to be processed.

It is noted that FIG. 3 may represent one of the number of fabric configurations in which computing fabric 10 may be configured, where, in other fabric configurations, the programmable logic blocks (e.g., I/O block 30, elastic AI/ML processing block 40, elastic sensor management block 100) may be configured with different hardware and software setups (different sets of operations) and may be interconnected different via interconnect structure 20.

Figure 5:
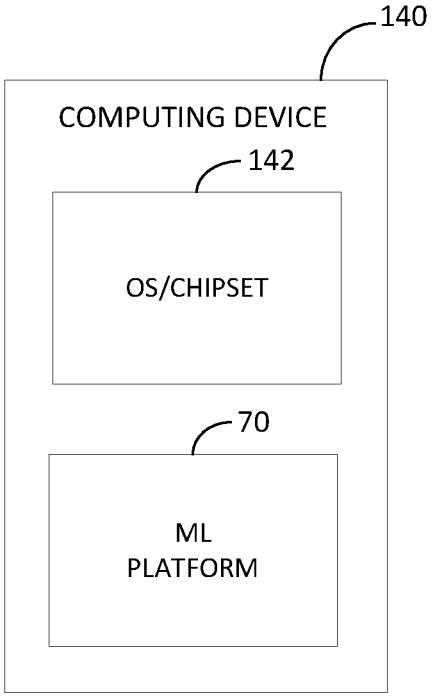
FIG. 5 is a block and schematic diagram generally illustrating a computing device including a machine learning platform, according to one example.

FIG. 5 is a block and schematic diagram generally illustrating a computing device 140 having an operating system running on a CPU/chipset, as indicated at 142, in which ML platform 70 is implemented as a companion subsystem to and operates below the OS running on the chipset, in accordance with the present disclosure. In examples, device 140 comprises an edge computing device. In other examples, it is noted that computing device 140 does not include CPU/chipset 142, such that ML platform 70 is not implemented as a subsystem.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A reconfigurable computing fabric to manage machine learning (ML) processing, the computing fabric comprising:
    a configurable interconnect structure of a field programmable gate array (FPGA); and
    a number of programmable logic blocks of the FPGA each having a configurable set of operations, wherein for each of a number of fabric configurations of the computing fabric, each programmable logic block has a corresponding set of operations and the interconnect structure has a corresponding data path structure to interconnect the programmable logic blocks with one another and with inputs and outputs of the computing fabric, and wherein the programmable logic blocks of the FPGA include:

an input/output block having a set of operations including to:

provide customizable virtual input interfaces to receive external session requests for ML processing from a number of request sources; and an elastic artificial intelligence (AI) processing block having a set of operations including to:

configure a number of AI/ML engines with a session implementation for each external session request and each of a number of event-driven internal session requests; and direct input data for each external and each internal session request to the AI/ML engines configured with the corresponding session implementation for processing.

2. The computing fabric of claim 1, wherein the configurable set of operations of each programmable logic block is based on a hardware and software setup of the programmable logic block where the hardware and software setup is different for each fabric configuration.

3. The computing fabric of claim 1, wherein each session implementation is based on processing requirements of the corresponding session request and on a set of operating policies.

4. The computing fabric of claim 1, wherein the session implementation includes loading ML models onto the AI/ML engines based on the corresponding session request and a set of operating policies.

5. The computing fabric of claim 1, the elastic AI processing block including a session implementation state block to maintain a state of each session implementation for each session.

6. The computing fabric of claim 1, the set of operations of the input/output block further including to provide customizable virtual source interfaces with a number of input sources which are selected based on a session request, each virtual source interface to provide input data for the corresponding session request.

7. The computing fabric of claim 6, the input/output block including a session interface state block to maintain a state of each virtual input interface and each virtual source interface for a life of each session.

8. The computing fabric of claim 6, the input sources including a number of sensors each providing input data representative of a measured feature, the programmable logic blocks further including an elastic sensor management block including a dynamic sensor functionality block and a sensor fungibility block to manage data provided by the sensors.

9. The computing fabric of claim 8, the dynamic sensor functionality block including a set of operations to transform data from one or more physical sensors to dynamically form a virtual sensor providing an output representative of a feature different from a feature measured by the one or more physical sensors, the sensor fungibility block including a set of operations to select an input data representative of a same feature from multiple sensors, including from physical and dynamically formed virtual sensors, providing the same feature based on a set of operating policies.

10. A dynamically configurable machine learning (ML) platform comprising:

a reconfigurable computing fabric configurable to a number of fabric configurations, the computing fabric comprising:

a configurable interconnect structure of a field programmable gate array (FPGA); and a number of programmable logic blocks of the FPGA each having a configurable set of operations, wherein for each fabric configuration, each programmable logic block has a corresponding set of operations and the interconnect structure has a corresponding data path structure to interconnect the programmable logic blocks with one another and with inputs and outputs of the computing fabric, and wherein the programmable logic blocks of the FPGA include:

an input/output block having a set of operations including to:

provide customizable virtual input interfaces to receive external session requests for ML processing from a number of request sources; and an elastic artificial intelligence (AI) processing block having a set of operations including to:

configure a number of AI/ML engines with a session implementation for each external session request and each of a number of event-driven internal session requests; and direct input data for each external and each internal session request to the AI/ML engines configured with the corresponding session implementation for processing; and a supervisory controller to configure the computing fabric to a selected one of the number of fabric configurations.

11. The ML platform of claim 10, including:

the number of AI/ML engines; and a number of sensors, each sensor providing input data representative of a feature.

12. The ML platform of claim 11, the set of operations of the input/output block including to provide customizable virtual source interfaces with a number of input sources based on a session request, the input sources including the number of sensors, each virtual source interface to provide input data for the corresponding session request.

13. The ML platform of claim 12, the programmable logic blocks including an elastic sensor management block having:

a dynamic sensor functionality block including a set of operations to transform data representative of a measured feature from one or more physical sensors to dynamically form a virtual sensor providing input data representative of a feature different from the measured feature; and a sensor fungibility block including a set of operations to select input data representative of a given feature from multiple sensors providing the given feature, including from physical sensors and dynamically formed virtual sensors.

14. A device comprising:

a central processing unit (CPU) running an operating system; and a dynamically configurable machine learning (ML) platform including:

a reconfigurable computing fabric configurable to a number of fabric configurations, the computing fabric comprising:

a configurable interconnect structure of a field programmable gate array (FPGA); and a number of programmable logic blocks of the FPGA each having a configurable set of operations, wherein for each fabric configuration, each programmable logic block has a corresponding set of operations and the interconnect structure has a corresponding data path structure to interconnect the programmable logic blocks with one another and with inputs and outputs of the computing fabric, and wherein the programmable logic blocks of the FPGA include:

an input/output block having a set of operations including to:

provide customizable virtual input interfaces to receive external session requests for ML processing from a number of request sources, including the operating system running on the CPU; and an elastic artificial intelligence (AI) processing block having a set of operations including to:

configure a number of AI/ML engines with a session implementation for each external session request and each of a number of event-driven internal session requests; and direct input data for each external and each internal session request to the AI/ML engines configured with the corresponding session implementation for processing; and a supervisory controller to configure the computing fabric to a selected one of the number of fabric configurations.

15. The computing fabric of claim 1, wherein the number of request sources comprise an operating system running on a central processing unit (CPU).

16. The computing fabric of claim 15, wherein the programmable logic blocks of the FPGA are to operate in an active state to enable continued execution of at least one ML model on the AI/ML engines while the operating system is in a sleep, hibernate, or off mode.

17. The computing fabric of claim 1, wherein the elastic AI processing block is to partition a ML model onto the AI/ML engines and cause processing of the partitioned ML model on the AI/ML engines in parallel.

18. The computing fabric of claim 1, wherein the AI/ML engines comprise at least one AI/ML engine instantiated on the computing fabric and at least one AI/ML engine instantiated outside of the computing fabric.

19. The computing fabric of claim 1, wherein the programmable logic blocks of the FPGA are to direct a plurality of signals output by sensors to respectively corresponding AI/ML engines.

20. The device of claim 14, wherein the supervisory controller is a microcontroller external to the FPGA.

* * * * *